US012087487B2

United States Patent

(12) United States Patent
Seino et al.
(10) Patent No.: US 12,087,487 B2
(45) Date of Patent: Sep. 10, 2024

(54) COIL COMPONENT

(71) Applicant: TAIYO YUDEN CO., LTD., Tokyo (JP)

(72) Inventors: Hirotaro Seino, Tokyo (JP); Takayuki Arai, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 651 days.

(21) Appl. No.: 17/217,528

(22) Filed: Mar. 30, 2021

(65) Prior Publication Data

US 2021/0304947 A1 Sep. 30, 2021

(30) Foreign Application Priority Data

Mar. 31, 2020 (JP) ................................ 2020-064762
Sep. 7, 2020 (JP) ................................ 2020-149825
Mar. 4, 2021 (JP) ................................ 2021-034789

(51) Int. Cl.

| | |
|---|---|
| ***H01F 27/24*** | (2006.01) |
| ***H01F 17/00*** | (2006.01) |
| ***H01F 17/04*** | (2006.01) |
| ***H01F 27/255*** | (2006.01) |
| ***H01F 27/29*** | (2006.01) |
| ***H01F 27/32*** | (2006.01) |

(52) U.S. Cl.

CPC ....... *H01F 27/255* (2013.01); *H01F 17/0013* (2013.01); *H01F 27/292* (2013.01); *H01F 27/324* (2013.01); *H01F 2017/0066* (2013.01)

(58) Field of Classification Search

CPC .. H01F 27/255; H01F 17/0013; H01F 27/292; H01F 27/324; H01F 2017/0066; H01F 17/04; H01F 2017/048

See application file for complete search history.

(56) References Cited

U.S. PATENT DOCUMENTS

2018/0061550 A1* 3/2018 Lee .................... H01F 17/0013
2018/0218822 A1 8/2018 Yamamoto

FOREIGN PATENT DOCUMENTS

JP 2018037635 A * 3/2018 .............. H01F 1/14
JP 2018-121023 A 8/2018
JP 2019220609 A * 12/2019 ......... H01F 1/14733

* cited by examiner

*Primary Examiner* — Tuyen T Nguyen

(74) *Attorney, Agent, or Firm* — Pillsbury Winthrop Shaw Pittman, LLP

(57) ABSTRACT

A coil component includes: a laminated body containing a plurality of metal magnetic particles; and a coil conductor provided in the laminated body so as to contact with the laminated body and wound around a coil axis, wherein the laminated body has an insulating portion including a non-metal magnetic particle region defined by at least three of the plurality of metal magnetic particles in a sectional surface of the laminated body, and wherein in the insulating portion, an atomic percent of Si is highest among those of materials constituting the non-metal magnetic particle region other than oxygen.

16 Claims, 11 Drawing Sheets

COIL COMPONENT

CROSS-REFERENCE TO RELATED APPLICATIONS

This application is based on and claims the benefit of priority from Japanese Patent Application Serial No. 2020-064762 (filed on Mar. 31, 2020), Japanese Patent Application Serial No. 2020-149825 (filed on Sep. 7, 2020) and Japanese Patent Application Serial No. 2021-034789 (filed on Mar. 4, 2021) the contents of which are hereby incorporated by reference in their entirety.

TECHNICAL FIELD

The present disclosure relates to a coil component.

BACKGROUND

A conventional coil component such as an inductor typically includes a magnetic base body made of a magnetic material, a coil conductor provided in the magnetic base body and wound around a coil axis, and an external electrode connected to an end portion of the coil conductor. A known material of the magnetic base body is a metal magnetic material formed of metal magnetic particles. Metal magnetic materials typically have a higher saturation magnetic flux density than ferrite materials and thus are suitable as materials for a magnetic base body of a coil component through which a large current flows. An example of such a coil component made of a metal magnetic material is disclosed in Japanese Patent Application Publication No. 2018-121023.

The magnetic base body made of a metal magnetic material has a higher saturation magnetic flux density but a lower insulation quality than a magnetic base body made of a ferrite material. In addition, heat treatment in the manufacturing process of the coil component may cause migration of the metal atoms included in the conductor, such that the metal atoms of the coil conductor disperse into the magnetic base body. Such migration of the metal atoms of the coil conductor may further reduce the insulation quality of the magnetic base body made of the metal magnetic material.

SUMMARY

One object of the present invention is to provide a coil component less prone to migration of the metal atoms included in the coil conductor. Other objects of the present invention will be made apparent through the entire description in the specification.

A coil component according to one embodiment of the present invention comprises: a base body containing a plurality of metal magnetic particles; and a coil conductor provided in the base body so as to contact with the base body, wherein the base body has an insulating portion including a non-metal magnetic particle region defined by at least three of the plurality of metal magnetic particles in a sectional surface of the base body, and wherein in the insulating portion, an atomic percent of Si is highest among those of materials constituting the non-metal magnetic particle region other than oxygen. In one embodiment of the present invention, the coil conductor is wound around a coil axis.

In one embodiment of the present invention, at a geometric center of the non-metal magnetic particle region in a sectional surface thereof along the coil axis, an atomic percent of Si may be highest among those of the materials constituting the non-metal magnetic particle region other than oxygen. In one embodiment of the present invention, at a geometric center of the non-metal magnetic particle region in a sectional surface of the base body cut along a plane extending through the coil conductor, an atomic percent of Si may be highest among those of the materials constituting the non-metal magnetic particle region other than oxygen.

In one embodiment of the present invention, a surface of each of the plurality of metal magnetic particles may be coated with a coating layer containing Si, and a composition of a material of the coating layer may be different from a composition of the materials of the non-metal magnetic particle region at the geometric center.

In one embodiment of the present invention, the plurality of metal magnetic particles may be bonded to each other via the coating layer.

In one embodiment of the present invention, an atomic percent of Si in the non-metal magnetic particle region may be 50 at % to 95 at %.

In one embodiment of the present invention, the non-metal magnetic particle region may contain Fe, Cr, and/or Al.

In one embodiment of the present invention, the plurality of metal magnetic particles may be formed of an alloy containing Fe, Si, Cr, or Al.

In one embodiment of the present invention, the coil conductor may include a first conductor pattern and a second conductor pattern each extending along a planar direction perpendicular to the coil axis, and the first conductor pattern and the second conductor pattern may be separated from each other in a direction of the coil axis, and the insulating portion may be disposed between the first conductor pattern and the second conductor pattern.

In one embodiment of the present invention, the coil conductor may further comprise an external electrode provided on a surface of the base body and electrically connected to the coil conductor, and the insulating portion may be disposed between the coil conductor and the external electrode.

In one embodiment of the present invention, the coil conductor may be disposed in the insulating portion.

In one embodiment of the present invention, an entirety of the base body may be the insulating portion.

In one embodiment of the present invention, the insulating portion may be formed by heating a metal magnetic paste containing the plurality of metal magnetic particles and a silicon resin.

One embodiment of the present invention relates to a circuit board comprising any one of the above electronic components. One embodiment of the present invention relates to an electronic device comprising the above circuit board.

Advantageous Effects

The present invention provides a coil component less prone to migration of the metal atoms included in the coil conductor.

DESCRIPTION OF THE EMBODIMENTS

Various embodiments of the present invention will be hereinafter described with reference to the accompanying drawings. The constituents common to multiple drawings are denoted by the same reference signs throughout the drawings. For convenience of explanation, the drawings are not necessarily drawn to scale.

Figure 1:
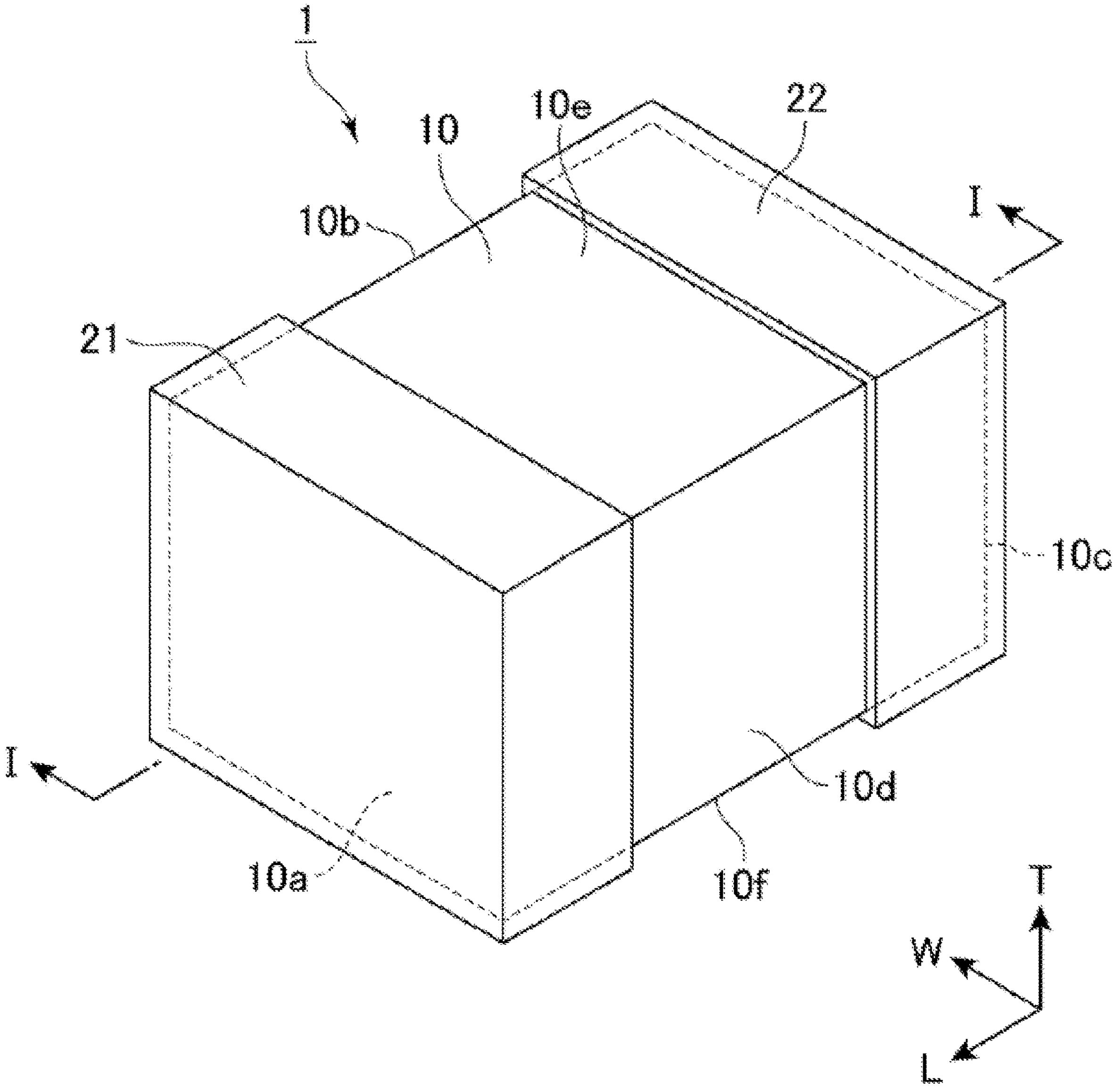
FIG. 1 is a perspective view of a coil component according to one embodiment of the present invention.
Figure 2:
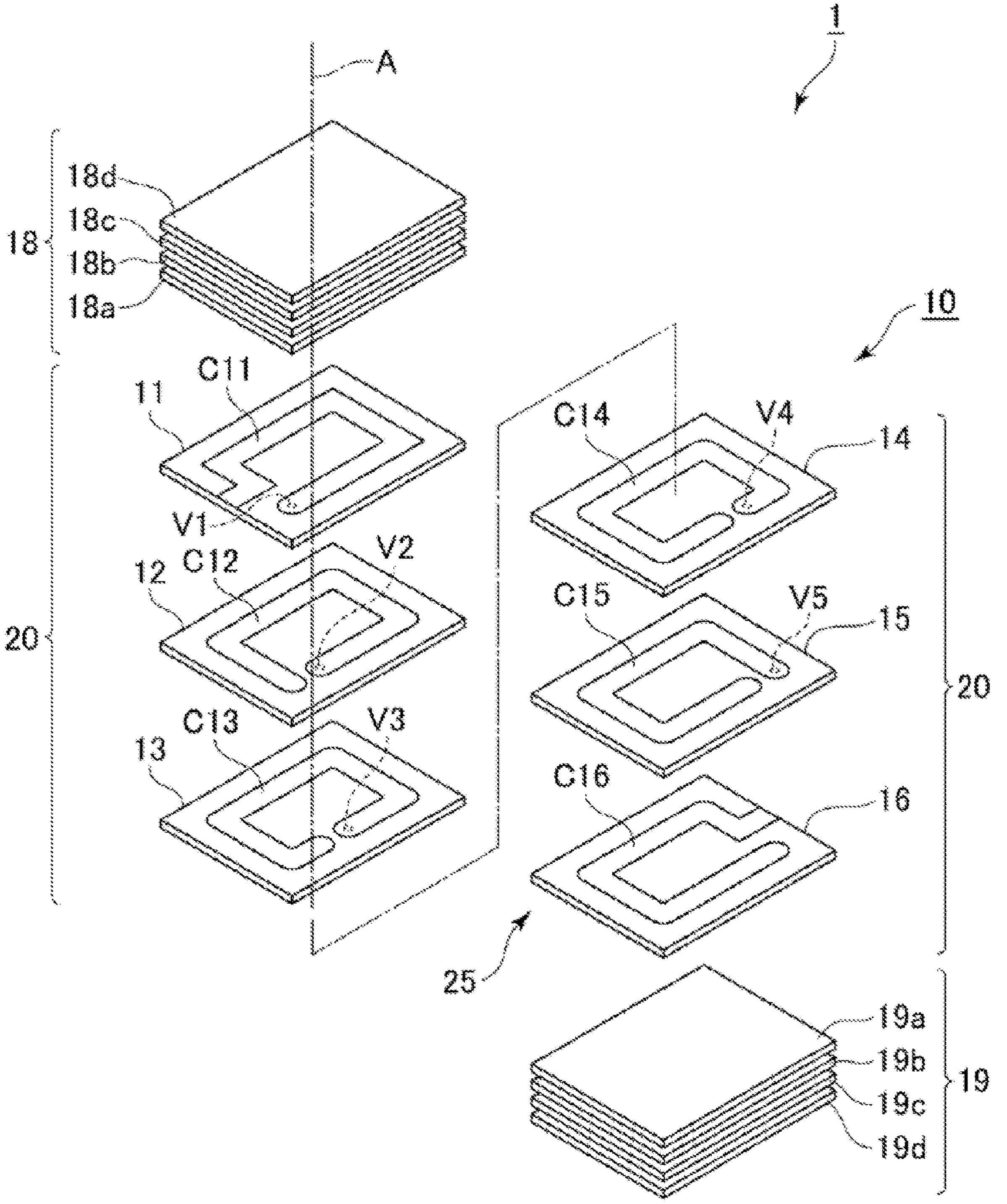
FIG. 2 is an exploded perspective view of the coil component shown in FIG. 1.

FIG. 1 is a perspective view of a coil component 1 according to one embodiment of the present invention, and FIG. 2 is an exploded perspective view of the coil component 1 shown in FIG. 1. By way of one example of the coil component 1, FIGS. 1 and 2 show a laminated inductor used as a passive element in various circuits. The laminated inductor is one example of a laminated coil component to which the present invention is applicable. The present invention is applicable to coil components other than the laminated inductor, such as those made by compression molding or thin film molding. The present invention is applicable to a power inductor incorporated in a power source line and to various other coil components.

The coil component 1 in the embodiment shown includes a laminated body (base body) 10 containing a plurality of metal magnetic particles, a coil conductor 25 disposed in the laminated body 10 and wound around a coil axis A, an external electrode 21 electrically connected to one end of the coil conductor 25, and an external electrode 22 electrically connected to the other end of the coil conductor 25. The laminated body 10 is a laminate of magnetic layers each made of a magnetic material. The coil conductor 25 includes conductor patterns C11 to C16. The conductor patterns C11 to C16 extend along the planar direction perpendicular to the coil axis A and are separated from each other in the direction of the coil axis A. Each of the conductor patterns C11 to C16 is electrically connected to adjacent conductor patterns through the vias V1 to V5. In this way, the coil conductor 25 is constituted by the conductor patterns C11 to C16 and the vias V1 to V5. The conductor pattern C11 is electrically connected to the external electrode 21, and the conductor pattern C16 is electrically connected to the external electrode 22.

As shown, in one embodiment of the present invention, the laminated body 10 is formed in a rectangular parallelepiped shape, for example. The laminated body 10 has a first principal surface 10*e*, a second principal surface 10*f*, a first end surface 10*a*, a second end surface 10*c*, a first side surface 10*b*, and a second side surface 10*d*. The outer surface of the laminated body 10 is defined by these six surfaces. The first principal surface 10*e* and the second principal surface 10*f* are opposed to each other, the first end surface 10*a* and the second end surface 10*c* are opposed to each other, and the first side surface 10*b* and the second side surface 10*d* are opposed to each other. In a case where the laminated body 10 is formed in a rectangular parallelepiped shape, the first principal surface 10*e* and the second principal surface 10*f* are parallel to each other, the first end surface 10*a* and the second end surface 10*c* are parallel to each other, and the first side surface 10*b* and the second side surface 10*d* are parallel to each other.

In the embodiment of FIG. 1, the first principal surface 10*e* lies on a top side of the laminated body 10, and therefore it may be herein referred to as "the top surface." Similarly, the second principal surface 10*f* may be referred to as "the bottom surface." The coil component 1 is disposed such that the second principal surface 10*f* faces the circuit board (not shown), and therefore, the second principal surface 10*f* may be herein referred to as "the mounting surface." The top-bottom direction of the coil component 1 is based on the top-bottom direction in FIG. 1.

In this specification, a "length" direction, a "width" direction, and a "thickness" direction of the coil component 1 are referred to as an "L axis" direction, a "W axis" direction, and a "T axis" direction in FIG. 1, respectively, unless otherwise construed from the context. The L axis, the W axis, and the T axis are perpendicular to one another. The coil axis A extends in the T axis direction. The direction in which the plane including the W axis direction and the L axis direction extends is the planar direction.

In one embodiment of the present invention, the coil component 1 has a length (the dimension in the direction of the L axis) of 0.2 to 6.0 mm, a width (the dimension in the direction of the W axis) of 0.1 to 4.5 mm, and a thickness (the dimension in the direction of the T axis) of 0.1 to 4.0 mm. These dimensions are mere examples, and the coil component 1 to which the present invention is applicable can have any dimensions that conform to the purport of the present invention. In one embodiment, the coil component 1 has a low profile. For example, the coil component 1 has a width larger than the thickness thereof.

FIG. 2 is an exploded perspective view of the coil component 1 shown in FIG. 1. In FIG. 2, the external electrode 21 and the external electrode 22 are omitted for convenience of illustration. As shown in FIG. 2, the laminated body 10 includes a body portion 20, a top cover layer 18 provided on the top-side surface of the body portion 20, and a bottom cover layer 19 provided on the bottom-side surface of the body portion 20. The body portion, which includes the magnetic layers 11 to 16 stacked together, is formed of the top cover layer 18, the magnetic layer 11, the magnetic layer 12, the magnetic layer 13, the magnetic layer 14, the magnetic layer 15, the magnetic layer 16, and the bottom cover layer 19 that are stacked in this order from the top to the bottom in FIG. 2.

The top cover layer 18 includes four magnetic layers 18*a* to 18*d*. The top cover layer 18 includes the magnetic layer 18*a*, the magnetic layer 18*b*, the magnetic layer 18*c*, and the magnetic layer 18*d* that are stacked in this order from the bottom to the top in FIG. 2.

The bottom cover layer 19 includes four magnetic layers 19*a* to 19*d*. The bottom cover layer 19 includes the magnetic layer 19*a*, the magnetic layer 19*b*, the magnetic layer 19*c*, and the magnetic layer 19*d* that are stacked in this order from the top to the bottom in FIG. 2.

The magnetic layers 11 to 16 constituting the body portion 20, the magnetic layers 18*a* to 18*d* constituting the top cover layer 18, and the magnetic layers 19*a* to 19*d* constituting the bottom cover layer 19 include metal magnetic particles and an insulating resin material. Metal magnetic particles applicable to the present invention are made of a material in which magnetism is developed in an unoxidized metal portion, and such metal magnetic particles are, for example, particles including unoxidized metal particles or alloy particles. Magnetic particles applicable to the present invention include, for example, Fe and at least one of Al and Mn as an alloy component. Materials of the magnetic particles applicable to the present invention may be particles of, for example, a Fe—Si—Cr—Al, Fe—Si—Cr—Mn, Fe—Si—Al, Fe—Si—Mn, or Fe—Ni alloy, a Fe—Si—Cr—B—C or Fe—Si—B—Cr amorphous alloy, Fe, or a mixture thereof. The resin material contained in the magnetic layers will be described later.

The coil component 1 can include any number of magnetic layers as necessary in addition to the magnetic layers 11 to 16, the magnetic layers 18*a* to 18*d*, and the magnetic layers 19*a* to 19*d*. Some of the magnetic layers 11 to 16, the magnetic layers 18*a* to 18*d*, and the magnetic layers 19*a* to 19*d* can be omitted as appropriate.

The magnetic layers 11 to 16 have corresponding conductor patterns C11 to C16 embedded therein, respectively. Before the magnetic layers 11 to 16 are stacked together, the top-side surfaces of the conductor patterns C11 to C16 are exposed at the top-side surfaces of the magnetic layers 11 to 16, respectively. The conductor patterns C11 to C16 extend around the coil axis A. In the embodiment shown, the coil axis A extends in the T axis direction, which is the same as the lamination direction of the magnetic layers 11 to 16.

The magnetic layers 11 to 15 are provided with vias V1 to V5, respectively, at predetermined locations therein. The vias V1 to V5 are formed by forming a through-hole at the predetermined location in the magnetic layers 11 to 15 so as to extend through the magnetic layers 11 to 15 in the Taxis direction and then filling the through-holes with a metal material.

The conductor patterns C11 to C16 and the vias V1 to V5 are formed to contain a metal having an excellent electrical conductivity, such as Ag, Pd, Cu, or Al, or any alloy of these metals.

In one embodiment, the external electrode 21 is provided on the first end surface 10*a* of the laminated body 10, and the external electrode 22 is provided on the second end surface 10*c* of the laminated body 10. As shown, the external electrode 21 and the external electrode 22 may extend onto the top surface 10*e*, the bottom surface 10*f*, the first side surface 10*b*, and the second side surface 10*d* of the laminated body 10. In this case, the external electrode 21 covers the entirety of the first end surface 10*a* and a part of each of the top surface 10*e*, the bottom surface 10*f*, the first side surface 10*b*, and the second side surface 10*d* of the laminated body 10, and the external electrode 22 covers the entirety of the second end surface 10*c* and a part of each of the top surface 10*e*, the bottom surface 10*f*, the first side surface 10*b*, and the second side surface 10*d* of the laminated body 10. The shapes of the external electrode 21 and the external electrode 22 are not particularly limited and can be adjusted as appropriate. For example, the external electrode 21 may be L-shaped and cover a part of each of the first end surface 10*a* and the bottom surface 10*f*, or it may be plate-shaped and cover a part of the bottom surface 10*f*. Likewise, the external electrode 22 may be L-shaped and cover a part of each of the second end surface 10*c* and the bottom surface 10*f*, or it may be plate-shaped and cover a part of the bottom surface 10*f*.

Figure 3:
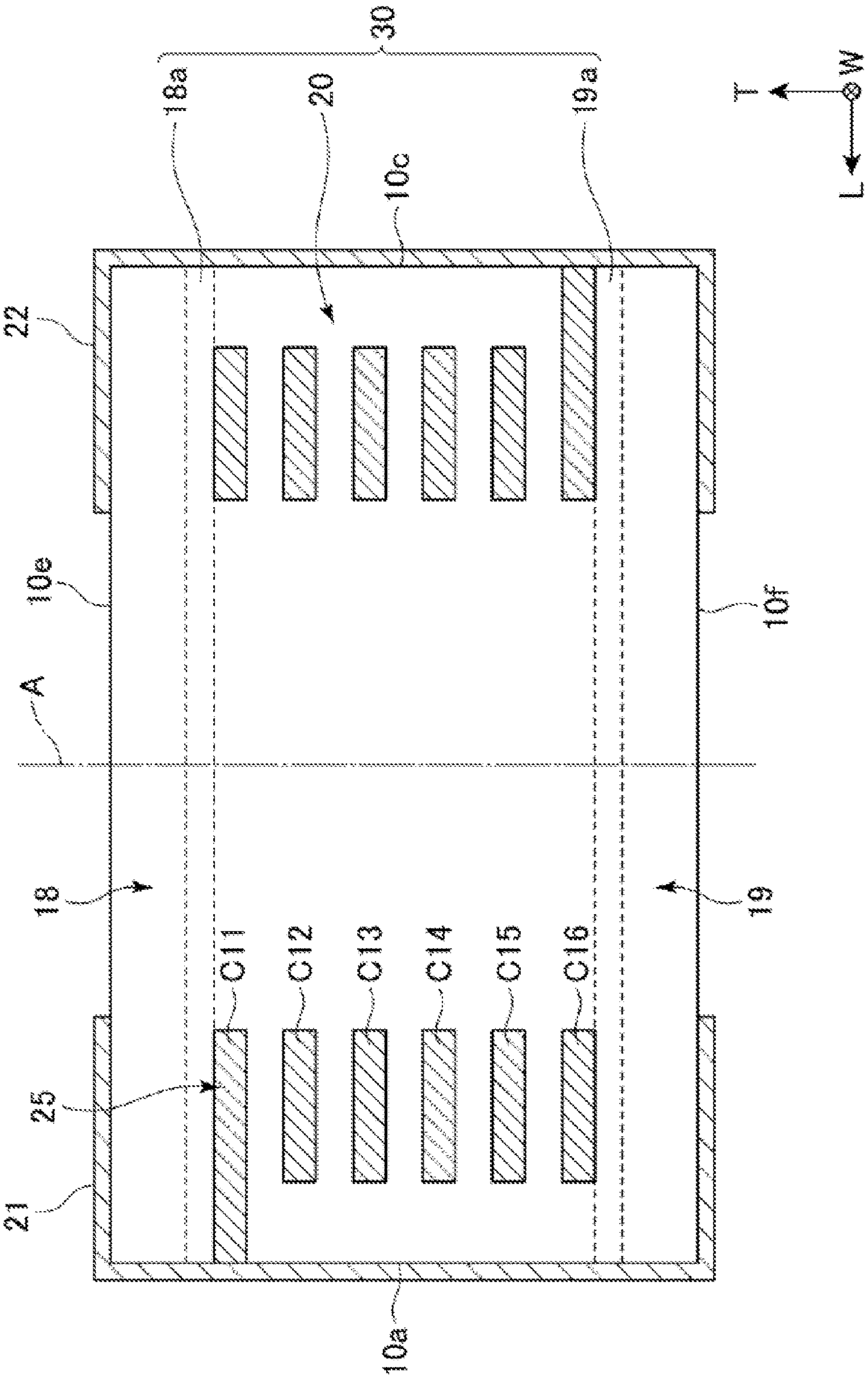
FIG. 3 schematically shows a longitudinal section of the coil component along the line I-I in FIG. 1.
Figure 4:
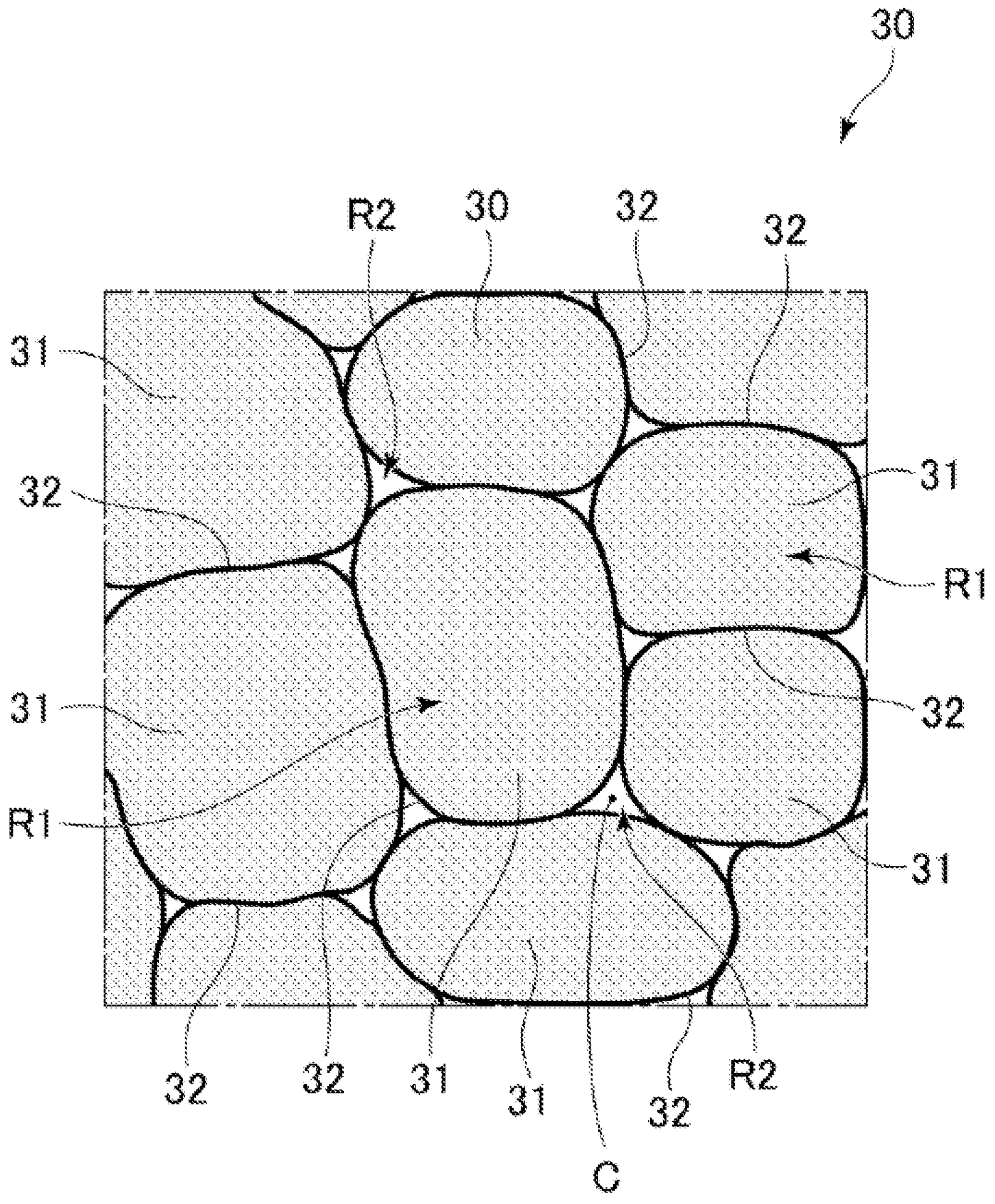
FIG. 4 is an enlarged sectional view schematically showing a partial region of an insulating portion shown in FIG. 3.

Next, with reference to FIGS. 3 and 4, a further description is given of the laminated body 10 of the coil component 1. FIG. 3 schematically shows a longitudinal section of the coil component 1 along the line I-I in FIG. 1. In FIG. 3, a part of the magnetic layers included in the laminated body 10 is omitted. FIG. 4 is an enlarged sectional view schematically showing a partial region of an insulating portion 30 shown in FIG. 3.

In one or more embodiments of the present invention, the laminated body 10 includes the insulating portion 30 that forms at least a part of the laminated body 10. The laminated body 10 may be entirely formed of the insulating portion 30. In the embodiment shown in FIG. 3, the insulating portion 30 encloses the coil conductor 25. In other words, in the coil component 1 shown, the coil conductor 25 is provided within the insulating portion 30. The coil conductor 25 is provided in the laminated body 10 so as to contact with the insulating portion 30. More specifically, in the embodiment shown, the insulating portion 30 includes the magnetic layers 11 to 16 constituting the body portion 20 (see FIG. 2), the magnetic layer 18*a* of the top cover layer 18, and the magnetic layer 19*a* of the bottom cover layer 19.

The magnetic layers of the laminated body 10 are formed of a metal magnetic paste containing the metal magnetic particles and the insulating resin material. The metal magnetic paste used for the magnetic layers 11 to 16, 18*a*, 19*a* constituting the insulating portion 30 contains a silicon resin as the resin material. The proportion of the silicon resin in the metal magnetic paste may be, for example, 5 vol % to 50 vol %. For the metal magnetic paste used for the magnetic layers not constituting the insulating portion 30 (the magnetic layers 18*b* to 18*d*, 19*b* to 19*d* in this embodiment), examples of the resin material contained in this metal magnetic paste include a polyvinyl butyral (PVB) resin, an ethyl cellulose resin, a polyvinyl alcohol resin, and an acrylic resin. The resin material used for the magnetic layers 18*b* to 18*d*, 19*b* to 19*d* not constituting the insulating portion 30 may be a highly insulating thermosetting resin. Examples of this thermosetting resin include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PBO) resin.

As shown in FIG. 4, the insulating portion 30 includes metal magnetic particle regions R1 and non-metal magnetic particle regions R2. The metal magnetic particle regions R1 are formed of a plurality of metal magnetic particles 31, and the non-metal magnetic particle regions R2 are each defined by at least three metal magnetic particles 31 in a sectional surface of the laminated body 10 along any direction. In the sectional surface of the laminated body 10, the three metal magnetic particles 31 defining one non-metal magnetic particle region R2 contact with each other. The non-metal magnetic particle regions R2 may be each defined by four or more metal magnetic particles 31. In the non-metal magnetic particle regions R2, the proportion of Si is the highest among those of the materials constituting the non-metal magnetic particle regions R2 other than oxygen. The non-metal magnetic particle regions R2 are filled with a Si oxide. The non-metal magnetic particle regions R2 may contain, for example, Fe and/or Cr in addition to Si and oxygen. Of the materials constituting the non-metal magnetic particle regions R2 other than oxygen, the proportion of Si is 50 at % to 95 at %, by way of one example.

The proportion of Si in each non-metal magnetic particle region R2 is based on the geometric center C of the non-metal magnetic particle region R2 as viewed in the sectional surface thereof along the coil axis A. At the geometric center C of the non-metal magnetic particle region R2 as viewed in the sectional surface thereof along the coil axis A, the atomic percent of Si is the highest among those of the materials other than oxygen. The proportion of Si is measured by, for example, EDS (energy dispersive X-ray spectroscopy) analysis.

The surface of each metal magnetic particle 31 may be coated with a coating layer 32. The coating layer 32 may be, for example, an oxide film formed of oxidized surface of the metal magnetic particle 31, a coating film containing Si, or a coating film containing an element other than Si. The oxide film and the coating film may be insulating films. The metal magnetic particles 31 are bonded to each other via the coating layers 32. When the coating layer 32 is formed on the surface of the metal magnetic particle 31, the coating layer 32 is a part of the metal magnetic particle 31 and is included in the metal magnetic particle region R1. The composition of the material of the coating layer 32 may be different from the composition of the materials of the non-metal magnetic particle region R2 at the geometric center C.

Next, a description is given of an example of a method of manufacturing the coil component 1. The first step is to form a top laminate, an intermediate laminate, and a bottom laminate. The top laminate will constitute the top cover layer 18, and the bottom laminate will constitute the bottom cover layer 19. The top laminate is formed by stacking together a plurality of magnetic sheets that are to be the magnetic layers 18*a* to 18*d*. Likewise, the bottom laminate is formed by stacking together a plurality of magnetic sheets that are to be the magnetic layers 19*a* to 19*d*. These magnetic sheets are formed by, for example, applying a metal magnetic paste to a surface of a plastic base film, drying the metal magnetic paste, and cutting the dried metal magnetic paste to a predetermined size. The metal magnetic paste is formed of, for example, a resin material containing metal magnetic particles mixed with a solvent. The magnetic sheets to be the magnetic layers constituting the insulating portion 30 (the magnetic layers 11 to 16, 18*a*, 19*a* in the embodiment shown) are formed using a silicon resin as the resin material. The resin material used in the magnetic sheets to be the magnetic layers not constituting the insulating portion 30 (the magnetic layers 18*b* to 18*d*, 19*b* to 19*d* in the embodiment shown) may be, for example, a polyvinyl butyral (PVB) resin, an epoxy resin, or any other resin materials having an excellent insulation quality.

The intermediate laminate is formed by stacking together a plurality of sheets each including a conductor pattern, a magnetic layer, and an insulator. In producing each sheet, a green sheet is first formed on a base film. The green sheet has a through-hole extending through the green sheet in the lamination direction and configured to receive a via formed therein. Next, the conductor pattern is formed on the green sheet by screen printing or any other method. At this time, the metal material that forms the conductor pattern is filled into the through-hole to form the via. The magnetic layer is then printed where the conductor pattern is not formed. After the sheets including the conductor patterns C11 to C16 are formed, the base film is removed, and the sheets are stacked together in the order from the sheet including the conductor pattern C16 to the sheet including the conductor pattern C11. Since there is no conductor pattern below the conductor pattern C16, the sheet including the conductor pattern C16 may not have a through-hole for forming the via.

Next, the intermediate laminate formed in the above-described manner is sandwiched between the top laminate on the top side and the bottom laminate on the bottom side, and the top laminate and the bottom laminate are bonded to the intermediate laminate by thermal compression to obtain a body laminate. Next, the body laminate is diced into pieces of a desired size using a cutter such as a dicing machine or a laser processing machine to obtain chip laminates corresponding to the laminated body 10. Next, the chip laminate is degreased and then heated at a predetermined temperature. This heat treatment causes the silicon resin contained in the metal magnetic paste to be thermally decomposed into a Si oxide that is filled into the non-metal magnetic particle regions R2 in the insulating portion 30. When the metal magnetic particles contain at least one of Al and Mn as an alloy component, the heat treatment produces at least one of Al oxide and Mn oxide that fills the non-metal magnetic particle regions R2 in the insulating portion 30. In this way, the non-metal magnetic particle regions R2 may contain the Si oxide and at least one of Al oxide and Mn oxide mixed together. Since the metal magnetic particles contain at least one of Al and Mn, the voids of the non-metal magnetic particle regions R2 can be reduced as compared to the case where the metal magnetic particles do not contain Al or Mn. Further, since at least one of Al oxide and Mn oxide is present in the non-metal magnetic particle regions R2, adjacent metal magnetic particles can be bound firmly to each other to increase the mechanical strength of the base body 10. Following the heat treatment, a conductive paste is applied to the both end portions of the chip laminate to form the external electrode 21 and the external electrode 22. The coil component 1 is thus obtained.

Figure 5:
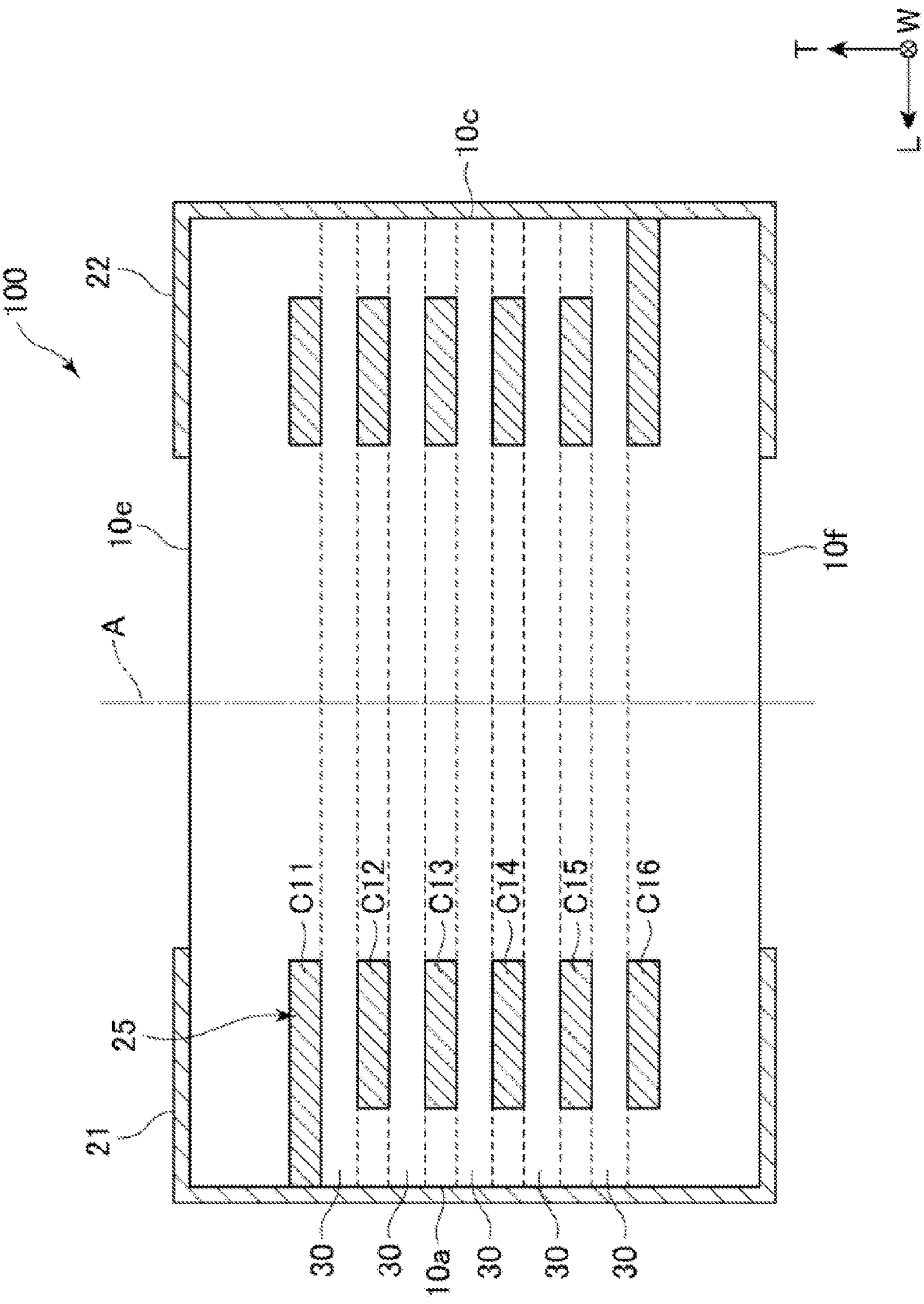
FIG. 5 schematically shows a longitudinal section of a coil component according to another embodiment of the present invention.

Next, another embodiment of the invention will be described with reference to FIG. 5. FIG. 5 is a sectional view of the coil component according to the other embodiment cut along the plane corresponding to the longitudinal section of the FIG. 3. As shown in FIG. 5, similarly to the coil component 1, the coil component 100 according to the other embodiment of the present invention includes a laminated body 10 containing a plurality of metal magnetic particles, a coil conductor 25 disposed in the laminated body 10 and wound around a coil axis A, an external electrode 21 electrically connected to one end of the coil conductor 25, and an external electrode 22 electrically connected to the other end of the coil conductor 25. The coil component 100 differs from the coil component 1 in that the insulating portion 30 of the laminated body 10 is disposed only in interposing regions disposed between the conductor patterns C11 to C16 that are adjacent to each other in the direction of the coil axis A. The interposing regions extend over the entirety of the laminated body 10 in the planar direction along the L axis direction and the W axis direction.

Figure 6:
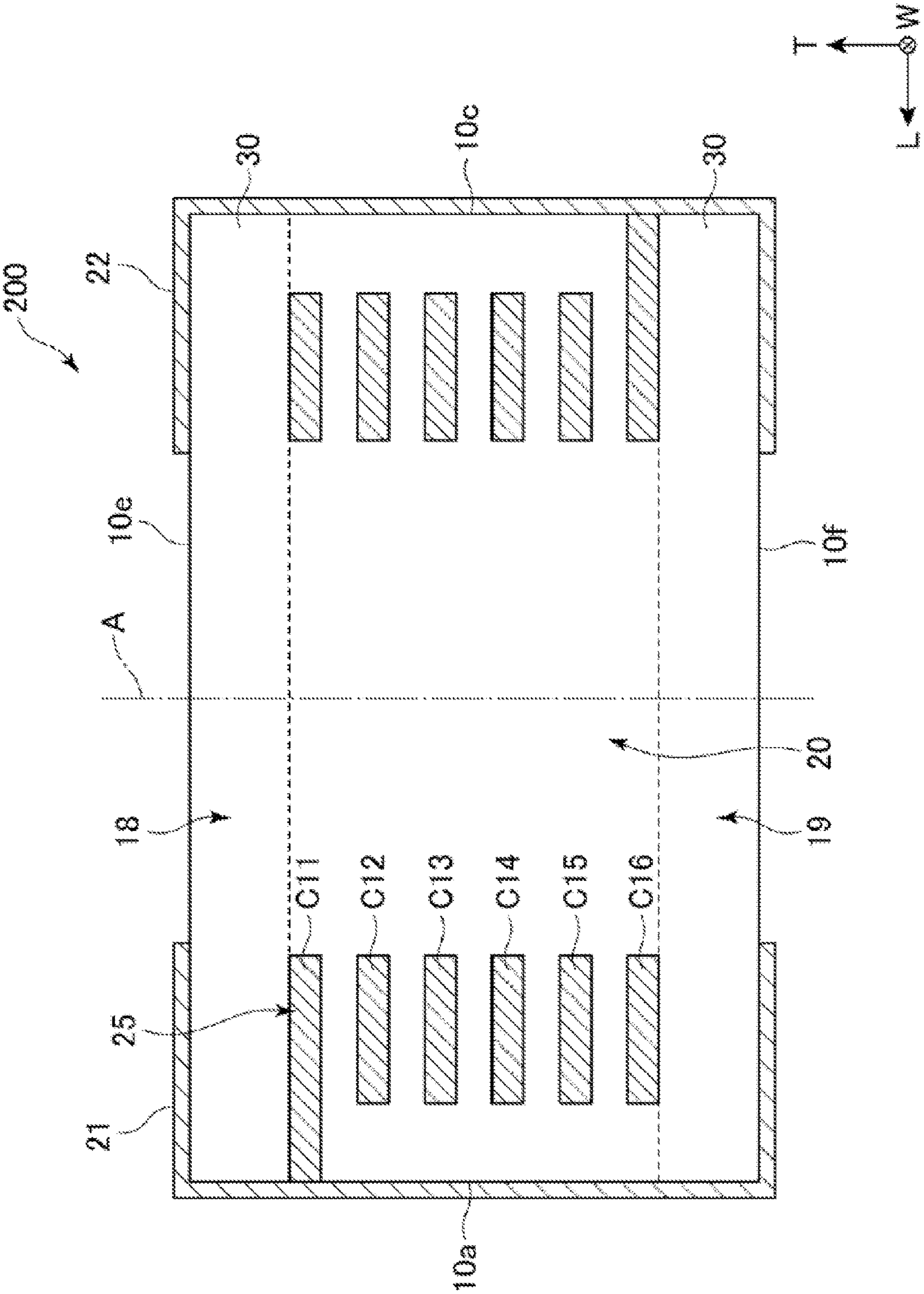
FIG. 6 schematically shows a longitudinal section of a coil component according to another embodiment of the present invention.

Next, another embodiment of the invention will be described with reference to FIG. 6. FIG. 6 is a sectional view of the coil component according to the other embodiment cut along the plane corresponding to the longitudinal section of the FIG. 3. As shown in FIG. 6, similarly to the coil component 1, the coil component 200 according to the other embodiment of the present invention includes a laminated body 10 containing a plurality of metal magnetic particles, a coil conductor 25 disposed in the laminated body 10 and wound around a coil axis A, an external electrode 21 electrically connected to one end of the coil conductor 25, and an external electrode 22 electrically connected to the other end of the coil conductor 25. In the coil component 200, the insulating portion 30 is disposed in a region between the conductor pattern C11 and the top surface 10*e* of the laminated body 10 and a region between the conductor pattern C16 and the bottom surface 10*f* of the laminated body 10 in the direction of the coil axis A. In other words, in the coil component 200, the top cover layer 18 (magnetic layers 18*a* to 18*d*) and the bottom cover layer 19 (magnetic layers 19*a* to 19*d*) correspond to the insulating portion 30.

Figure 7:
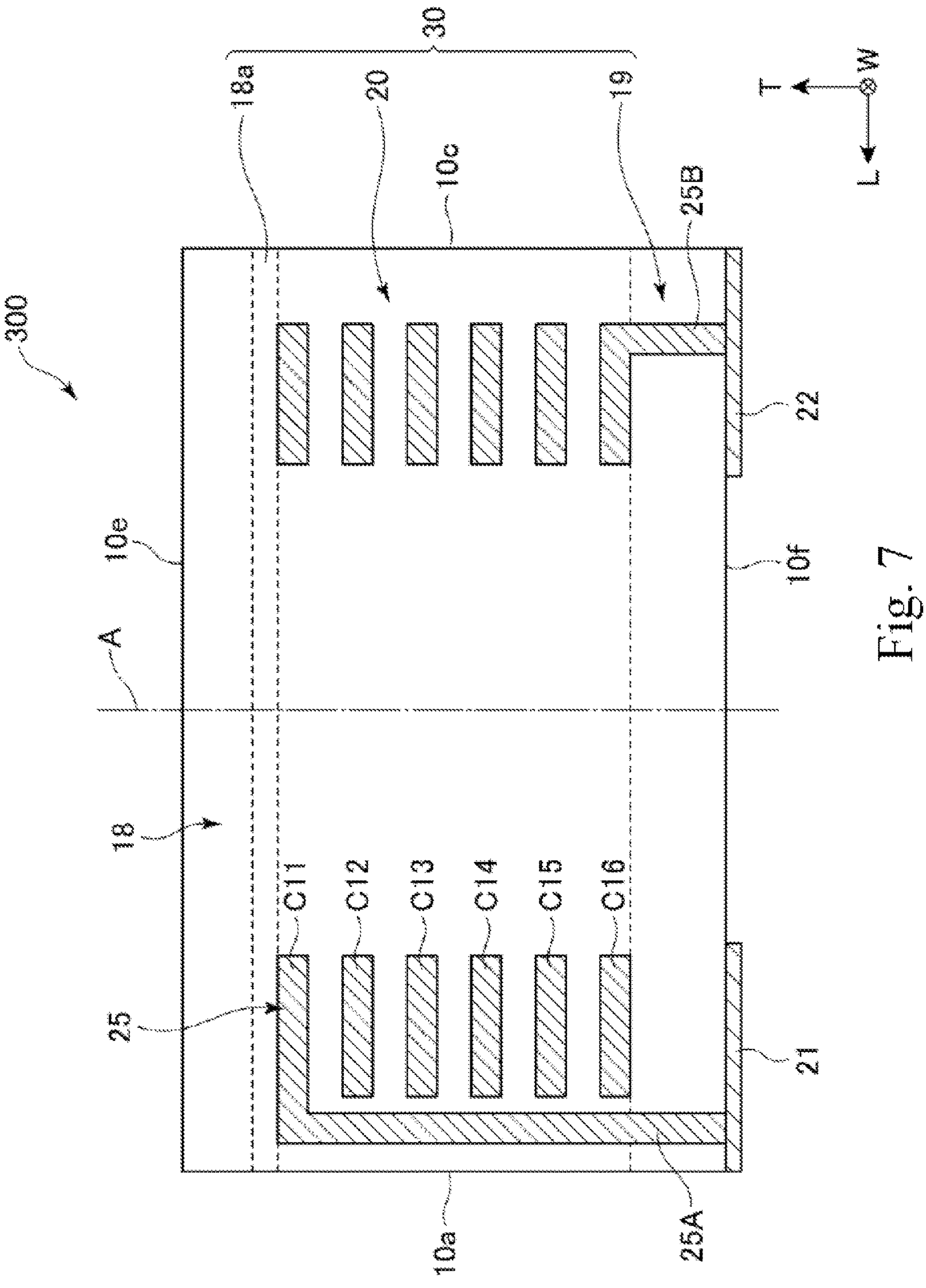
FIG. 7 schematically shows a longitudinal section of a coil component according to another embodiment of the present invention.

Next, another embodiment of the invention will be described with reference to FIG. 7. FIG. 7 is a sectional view of the coil component according to the other embodiment cut along the plane corresponding to the longitudinal section of the FIG. 3. As shown in FIG. 7, similarly to the coil component 1, the coil component 300 according to the other embodiment of the present invention includes a laminated body 10 containing a plurality of metal magnetic particles, a coil conductor 25 disposed in the laminated body 10 and wound around a coil axis A, an external electrode 21 electrically connected to one end of the coil conductor 25, and an external electrode 22 electrically connected to the other end of the coil conductor 25. In the coil component 300, the external electrodes 21, 22 are provided only on the bottom surface 10*f* of the laminated body 10. The coil conductor 25 additionally includes a lead-out conductor 25A and a lead-out conductor 25B. The lead-out conductor 25A electrically connects between one end of the coil conductor 25 and the external electrode 21, and the lead-out conductor 25B electrically connects between the other end of the coil conductor 25 and the external electrode 22. More specifically, the lead-out conductor 25A leads from the conductor pattern C11 along the direction of the coil axis A and connects to the external electrode 21. The lead-out conductor 25B leads from the conductor pattern C16 along the direction of the coil axis A and connects to the external electrode 22. The insulating portion 30 of the coil component 300 covers the entirety of the coil conductor 25 (that is, the conductor patterns C11 to C16, the vias V1 to V5, and the lead-out conductors 25A, 25B). In other words, in the coil component 300, the magnetic layers 11 to 16 included in the body portion 20, the magnetic layers 18*a* included in the top cover layer 18, and the magnetic layers 19*a* to 19*d* included in the bottom cover layer 19 correspond to the insulating portion 30. In this way, the insulating portion 30 is present in the region where the conductor pattern C16 faces the lead-out conductor 25A and thus the potential difference is the largest. The insulating portion 30 is also present in the regions where the conductor patterns C12 to C15 and the vias V1 to V5 face the lead-out conductor 25A and thus a potential difference is present, although the potential difference is smaller than that between the conductor pattern C16 and the lead-out conductor 25A.

Figure 8:
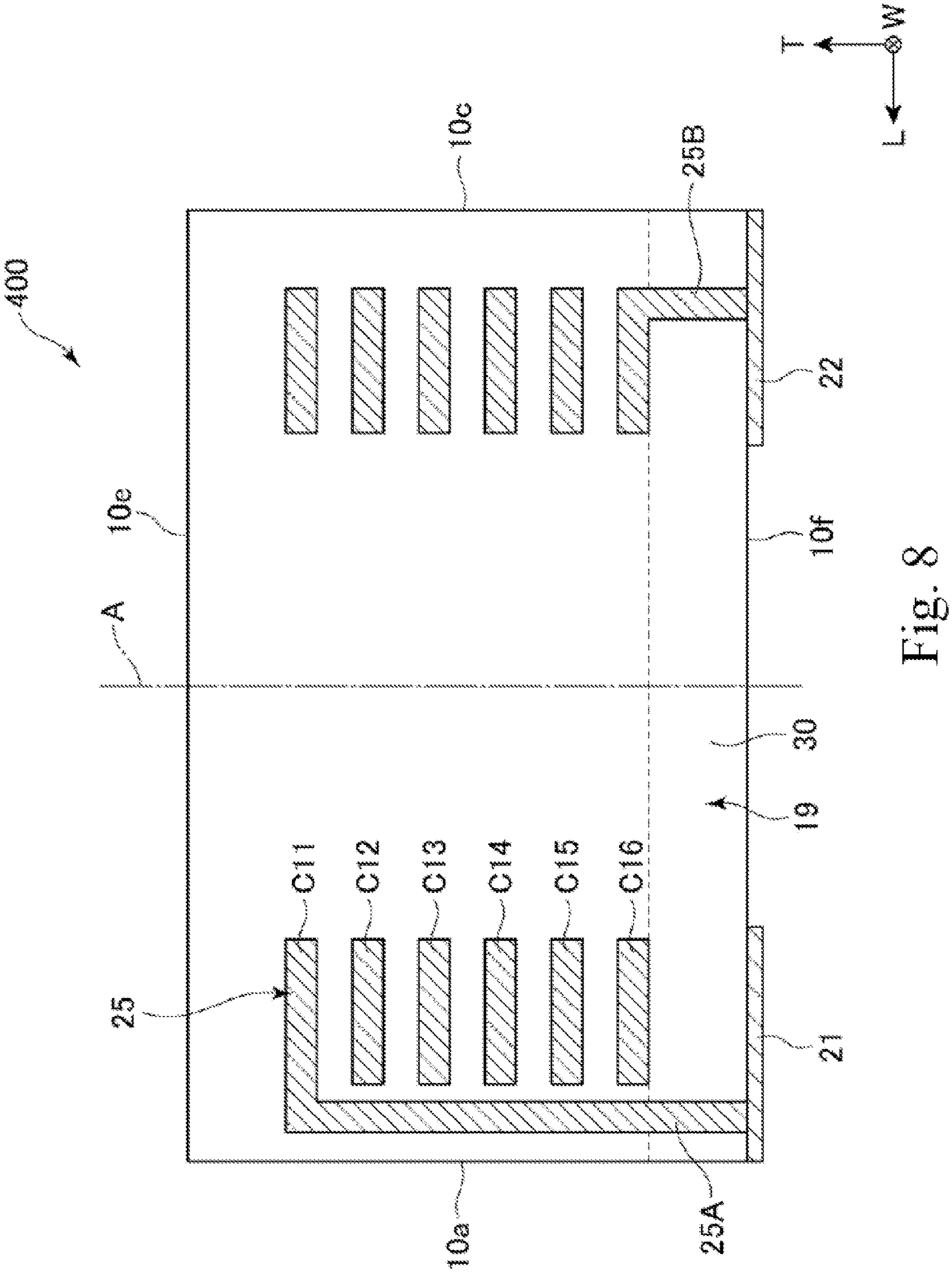
FIG. 8 schematically shows a longitudinal section of a coil component according to another embodiment of the present invention.

Next, another embodiment of the invention will be described with reference to FIG. 8. FIG. 8 is a sectional view of the coil component according to the other embodiment cut along the plane corresponding to the longitudinal section of the FIG. 3. As shown in FIG. 8, similarly to the coil component 300, the coil component 400 according to the other embodiment of the present invention includes a laminated body 10 containing a plurality of metal magnetic particles, a coil conductor 25 disposed in the laminated body 10 and wound around a coil axis A, an external electrode 21 electrically connected to one end of the coil conductor 25, and an external electrode 22 electrically connected to the other end of the coil conductor 25. As in the coil component 300, the external electrodes 21, 22 of the coil component 400 are provided only on the bottom surface 10*f* of the laminated body 10, and the coil conductor 25 additionally includes a lead-out conductor 25A and a lead-out conductor 25B. The lead-out conductor 25A electrically connects between one end of the coil conductor 25 and the external electrode 21, and the lead-out conductor 25B electrically connects between the other end of the coil conductor 25 and the external electrode 22. More specifically, the lead-out conductor 25A leads from the conductor pattern C11 along the direction of the coil axis A and connects to the external electrode 21. The lead-out conductor 25B leads from the conductor pattern C16 along the direction of the coil axis A and connects to the external electrode 22. In the coil component 400, the insulating portion 30 is disposed in a region between the conductor pattern C16 and the bottom surface 10*f* of the laminated body 10 in the direction of the coil axis A. In other words, in the coil component 400, the bottom cover layer 19 (magnetic layers 19*a* to 19*d*) correspond to the insulating portion 30. In this way, the insulating portion 30 is present in the region between the conductor pattern C16 and the external electrode 21 where the potential difference is large.

Figure 9:
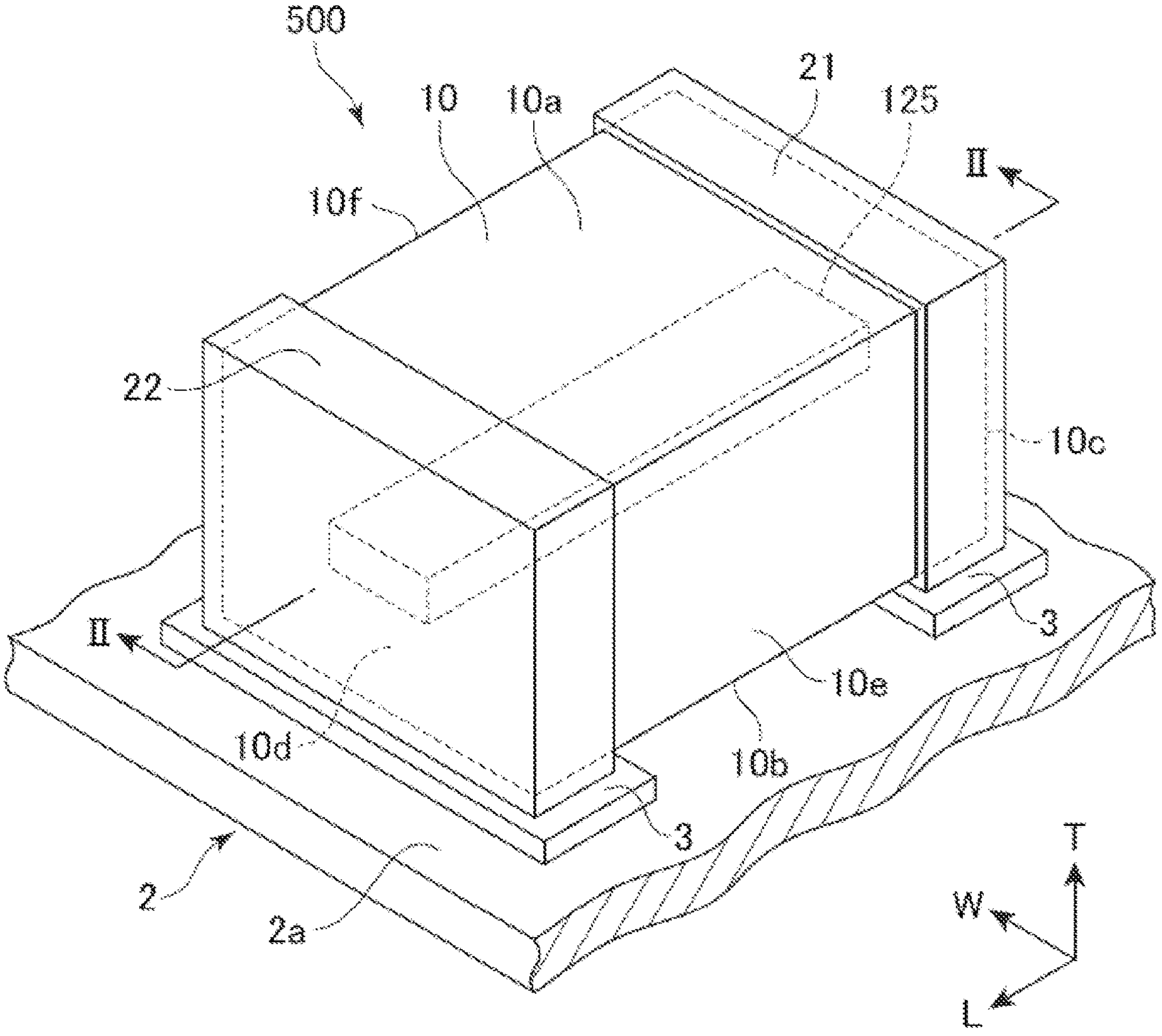
FIG. 9 is a perspective view of a coil component according to another embodiment of the present invention.

Next, another embodiment of the invention will be described with reference to FIGS. 9 and 10. FIG. 9 is a perspective view of the coil component according to the other embodiment of the invention. As shown in FIG. 9, similarly to the coil component 1, the coil component 500 according to the other embodiment of the invention includes a laminated body 10, The coil component 500 also includes a coil conductor 125 disposed in the laminated body 10, an external electrode 21 electrically connected to one end of the coil conductor 25, and an external electrode 22 electrically connected to the other end of the coil conductor 25.

The coil conductor 125 is positioned so as to be enclosed in the insulating portion 30 of the laminated body 10. The coil conductor 125 is provided in the laminated body 10 so as to contact with the insulating portion 30. The coil conductor 125 is exposed at one end thereof to the outside of the magnetic base body 10 through the first end surface 10*c* and is connected to the external electrode 21 at the one end. The coil conductor 125 is also exposed at the other end thereof to the outside of the magnetic base body 10 through the second end surface 10*d* and is connected to the external electrode 22 at the other end. In this manner, the coil conductor 125 is connected at one end thereof to the external electrode 21 and connected at the other end thereof to the external electrode 22.

The coil conductor 125 extends linearly from the external electrode 21 to the external electrode 22 in plan view (as viewed from the T axis). Stated differently, the coil conductor 125 has no separate parts facing each other in the laminated body 10 in a plan view. Herein, when the coil conductor 125 has no separate parts facing each other in the laminated body 10 in a plan view, this can mean the coil conductor 125 extends linearly from the external electrode 21 to the external electrode 22. In the embodiment shown, the coil conductor 125 has a rectangular parallelepiped shape. The coil conductor 125 may be formed by only a single conductor pattern or by a plurality of conductor patterns electrically insulated from each other in the laminated body 10. When the coil conductor 125 is formed by a plurality of conductor patterns, these conductor patterns have the same shape, and adjacent ones of the conductor patterns are separated from each other by a part of the insulating portion 30 of the laminated body 10.

Figure 10:
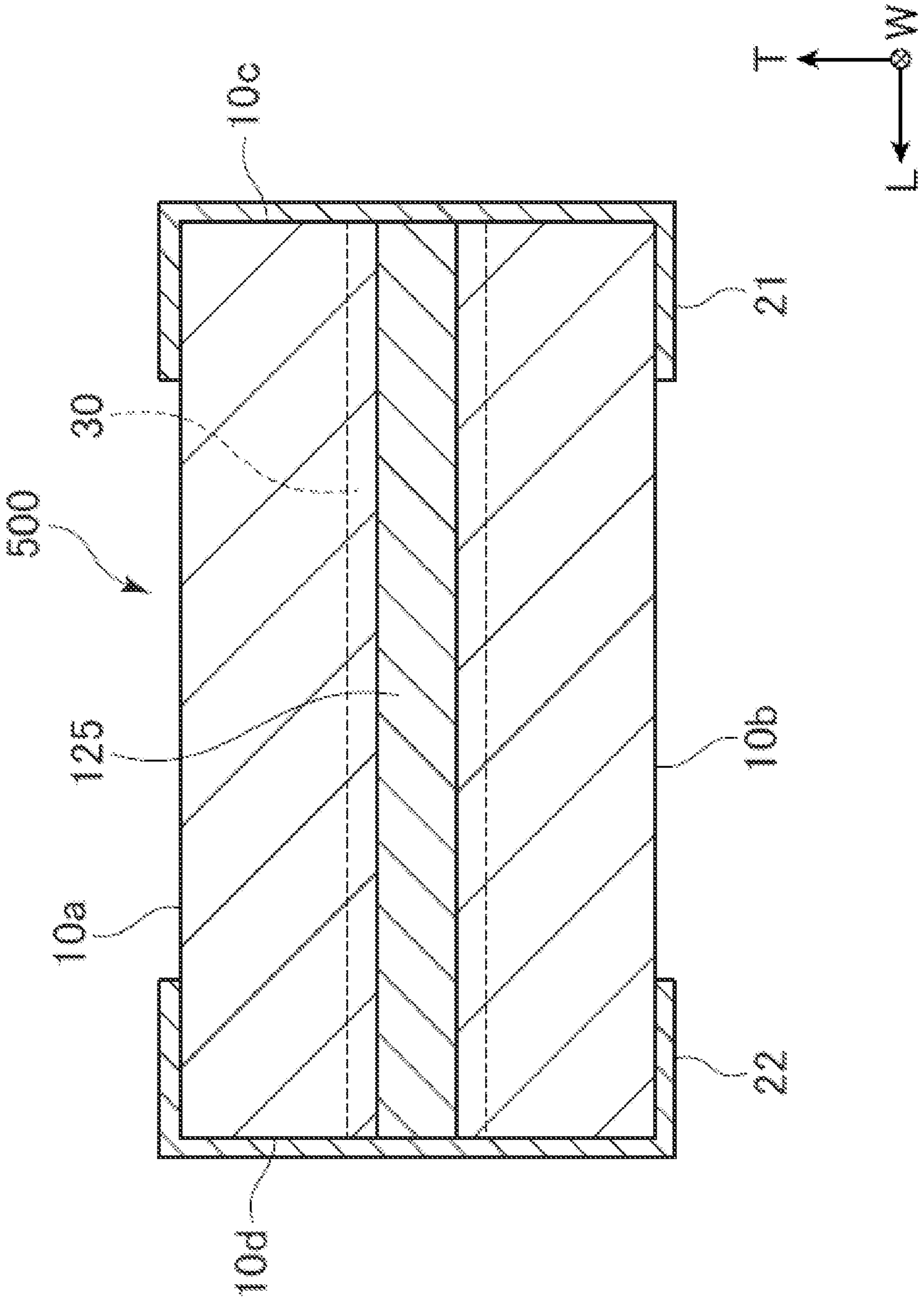
FIG. 10 schematically shows a longitudinal section of the coil component along the line II-II in FIG. 9.

In the embodiment shown in FIGS. 9 and 10, the insulating portion 30 is also configured as shown in FIG. 4.

Specifically, the insulating portion 30 includes metal magnetic particle regions R1 and non-metal magnetic particle regions R2. The metal magnetic particle regions R1 are formed of a plurality of metal magnetic particles 31, and the non-metal magnetic particle regions R2 are each defined by at least three metal magnetic particles 31 in a sectional surface of the laminated body 10 along any direction. In the non-metal magnetic particle regions R2, the proportion of Si is the highest among those of the materials constituting the non-metal magnetic particle regions R2 other than oxygen. The proportion of Si in each non-metal magnetic particle region R2 is based on the geometric center C of the non-metal magnetic particle region R2 in the sectional surface thereof cut along a plane extending through the coil conductor 125 (for example, a plane extending through the coil conductor 125 and parallel with the LT plane). In other words, at the geometric center C of the non-metal magnetic particle region R2 in the sectional surface thereof cut along a plane extending through the coil conductor 125, the atomic percent of Si is the highest among those of the materials other than oxygen.

Figure 11:
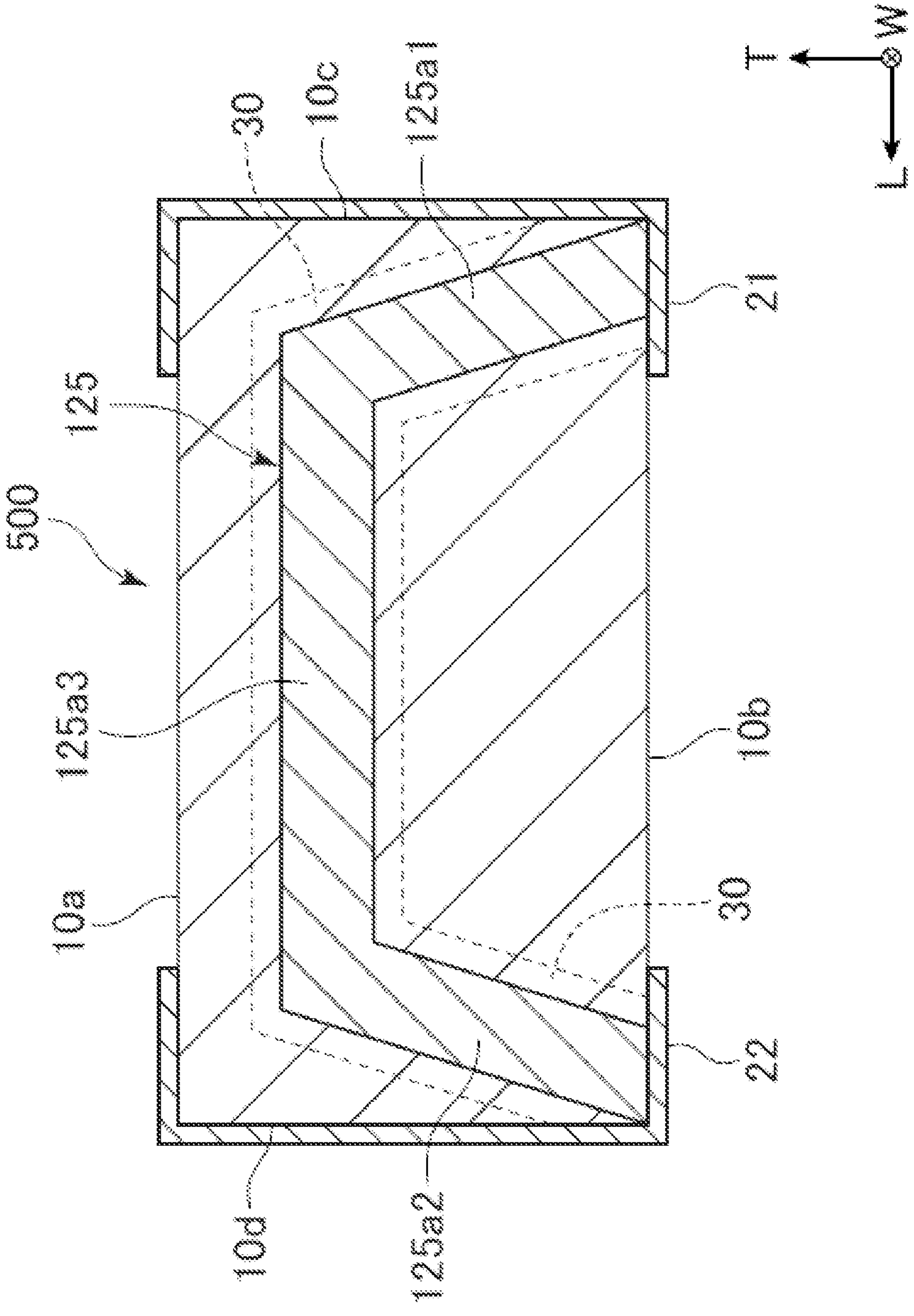
FIG. 11 schematically shows a modification of the coil conductor of FIG. 10.

The shape of the coil conductor 125 is not limited to the illustrated. As shown in FIG. 11, the coil conductor 125 may be configured such that the opposite ends thereof are exposed through the mounting surface 10*b* of the laminated body 10. The coil conductor 125 shown in FIG. 11 includes a first portion 125*a*1, a second portion 125*a*2, and a third portion 125*a*3. The first portion 125*a*1 is exposed at one end thereof through the mounting surface 10*b* and extends from the one end in the positive direction of the T axis and the positive direction of the L axis. The second portion 125*a*2 is exposed at one end thereof through the mounting surface 10*b* and extends from the one end in the positive direction of the T axis and the negative direction of the L axis. The third portion 125*a*3 connects between the top-side end of the first portion 125*a*1 and the top-side end of the second portion 125*a*2. The bottom-side end of the first portion 125*a*1 is connected to the external electrode 21, and the bottom-side end of the second portion 125*a*2 is connected to the external electrode 22. In the embodiment shown, the third portion 25*a*3 extends in parallel with the top surface 10*a*.

In one or more embodiments of the present invention, the laminated body 10 of the coil component has the insulating portion 30 that includes the non-metal magnetic particle regions R2 each defined by at least three metal magnetic particles 31, and the atomic percent of Si is the highest among those of the materials constituting the non-metal magnetic particle regions R2 other than oxygen. In conventional coil components, the resin contained in the metal magnetic paste is thermally decomposed into carbon dioxide and others by the heat treatment in the manufacturing process, and therefore, voids are formed in the regions each defined by a plurality of metal magnetic particles (corresponding to the non-metal magnetic particle regions R2). Presence of such voids encourages the metal magnetic particles to contact with oxygen and thus encourages oxidation of Fe, Si, Cr and the like contained in the metal magnetic particles. As a result, ionizable substances contained in the metal material of the coil conductor are encouraged to receive electrons, which may cause migration of the metal atoms in the coil conductor. By contrast, in the coil component 1 according to one embodiment of the present invention, the Si oxide is present in the non-metal magnetic particle regions R2, as described above. This is because a silicon resin is used as the resin contained in the metal magnetic paste and, when the silicon resin is thermally decomposed by the heat treatment, the Si component contained in the silicon resin remains after the thermal decomposition and oxidizes to form the Si oxide. Since the Si oxide is present in the non-metal magnetic particle regions R2, less voids are formed by the heat treatment, and thus the oxidation of Fe, Si, Cr and the like contained in the metal magnetic particles is inhibited. Therefore, the metal atoms of the coil conductor 25 can be inhibited from migrating by the heat treatment.

In one or more embodiments of the present invention, the migration of the metal atoms of the coil conductor 25 may occur when the metal atoms move in the non-metal magnetic particle regions R2 by application of a voltage to the coil component 25. In the coil component 1 according one embodiment of the present invention, it is inhibited that the voids are formed in the non-metal magnetic particle regions R2 of the insulating portion 30, and therefore, even after the coil component 1 is mounted on a circuit board, the metal atoms of the coil conductor 25 are inhibited from migrating by application of the voltage.

In one or more embodiments of the present invention, the coil conductor 25 is provided in the insulating portion 30. With this arrangement, the migration of the metal materials of the coil conductor 25 can be inhibited between any two of the conductor patterns C11 to C16 of the coil conductor 25 and between the coil conductor 25 and the external electrodes 21, 22. Accordingly, it is more secure that short circuits are inhibited from occurring in the coil component 1.

In one or more embodiments of the present invention, the insulating portion 30 is formed by heating a metal magnetic paste containing the metal magnetic particles 31 and the silicon resin. Since the silicon resin can be more easily fed into gaps between the metal magnetic particles 31 as compared to Si oxide particles, the filling factor of the Si oxide in the non-metal magnetic particle regions R2 can be increased. Therefore, the metal atoms of the coil conductor 25 can be more effectively inhibited from migrating by the heat treatment.

In one or more embodiments of the present invention, the coil conductor 25 includes the conductor patterns C11 to C16 extending along the planar direction perpendicular to the coil axis A and separated from each other in the direction of the coil axis A, and the insulating portion 30 may be provided between adjacent ones of the conductor patterns C11 to C16. With this arrangement, the migration of the metal materials of the coil conductor 25 can be inhibited between adjacent ones of the conductor patterns C11 to C16.

In one or more embodiments of the present invention, the coil component further includes the external electrodes 21, 22 provided on the surface of the laminated body 10 and electrically connected to the coil conductor 25, and the insulating portion 30 may be provided between the coil conductor 25 and the external electrode 21, 22. With this arrangement, the migration of the metal materials of the coil conductor 25 can be inhibited between the coil conductor 25 and the external electrodes 21, 22.

In one or more embodiments of the present invention, the metal magnetic particles 31 may contain Al. With this arrangement, the metal magnetic particles 31 tends to have a thick coating layer 32, and therefore, the gaps of the non-metal magnetic particle regions R2 defined by the metal magnetic particles 31 are smaller. Accordingly, narrower paths are left for movement of the metal elements constituting the coil conductor 25 that are ionized, and thus the migration of the metal elements can be inhibited.

In one or more embodiments of the present invention, the metal magnetic particles 31 may contain Cr. Since Cr inhibits oxidation of Fe contained in the metal magnetic particles 31, the metal elements of the coil conductor 25 can be inhibited from ionizing due to oxidation of Fe. Therefore, the metal materials of the coil conductor 25 can be inhibited from migrating.

The dimensions, materials, and arrangements of the constituent elements described for the above various embodiments are not limited to those explicitly described for the embodiments, and these constituent elements can be modified to have any dimensions, materials, and arrangements within the scope of the present invention. Furthermore, constituent elements not explicitly described herein can also be added to the above-described embodiments, and it is also possible to omit some of the constituent elements described for the embodiments.

For example, as to the various examples of the positions of the insulating portion 30 represented by the above embodiments, it is only required that the insulating portion 30 is provided in at least a part of the laminated body 10, and the position of the insulating portion 30 is not limited to those in the above embodiments.

What is claimed is:

1. A coil component comprising:

a base body containing a plurality of metal magnetic particles; and a coil conductor provided in the base body so as to contact with the base body and wound around a coil axis, wherein the base body has an insulating portion, the insulating portion is disposed so as to surround at least a part of the coil conductor, the insulating portion including a non-metal magnetic particle region defined by at least three of the plurality of metal magnetic particles in a sectional surface of the base body, and wherein at a geometric center of the non-metal magnetic particle region in a sectional surface thereof along the coil axis, an atomic percent of Si is highest among those of the materials constituting the non-metal magnetic particle region other than oxygen.

2. A coil component comprising:

a base body containing a plurality of metal magnetic particles; and a coil conductor provided in the base body so as to contact with the base body, wherein the base body has an insulating portion, the insulating portion is disposed so as to surround at least a part of the coil conductor, the insulating portion including a non-metal magnetic particle region defined by at least three of the plurality of metal magnetic particles in a sectional surface of the base body, and wherein at a geometric center of the non-metal magnetic particle region in a sectional surface of the base body cut along a plane extending through the coil conductor, an atomic percent of Si is highest among those of the materials constituting the non-metal magnetic particle region other than oxygen.

3. The coil component of claim 1, wherein a surface of each of the plurality of metal magnetic particles is coated with a coating layer containing Si, and wherein a composition of a material of the coating layer is different from a composition of the materials of the non-metal magnetic particle region at the geometric center.

4. The coil component of claim 3, wherein the plurality of metal magnetic particles are bonded to each other via the coating layer.

5. The coil component of claim 1, wherein an atomic percent of Si at the geometric center of the non-metal magnetic particle region is 50 at % to 95 at %.

6. The coil component of claim 1, wherein the non-metal magnetic particle region contains Fe, Cr, and/or Al.

7. The coil component of claim 6, wherein the plurality of metal magnetic particles are formed of an alloy containing Fe, Si, Cr, or Al.

8. The coil component of claim 1, wherein the non-metal magnetic particle region contains at least one of Al and Mn.

9. The coil component of claim 1, wherein the plurality of metal magnetic particles contain at least one of Al and Mn.

10. The coil component of claim 1, wherein the coil conductor includes a first conductor pattern and a second conductor pattern each extending along a planar direction perpendicular to the coil axis, and the first conductor pattern and the second conductor pattern are separated from each other in a direction of the coil axis, and wherein the insulating portion of the base body is disposed between the first conductor pattern and the second conductor pattern.

11. The coil component of claim 1, further comprising:

an external electrode provided on a surface of the base body and electrically connected to the coil conductor, wherein the insulating portion is disposed between the coil conductor and the external electrode.

12. The coil component of claim 1, wherein the coil conductor is disposed in the insulating portion.

13. The coil component of claim 1, wherein an entirety of the base body is the insulating portion.

14. The coil component of claim 1, wherein the insulating portion is formed by heating a metal magnetic paste containing the plurality of metal magnetic particles and a silicon resin.

15. A circuit board comprising the coil component of claim 1.

16. An electronic component comprising the circuit board of claim 15.

* * * * *